United States Patent [19]
Takagi et al.

[11] Patent Number: 5,627,511
[45] Date of Patent: May 6, 1997

[54] DISTANCE MEASURING APPARATUS FOR AUTOMOTIVE VEHICLES THAT COMPENSATES FOR THE INFLUENCE OF PARTICLES FLOATING IN THE AIR

[75] Inventors: Kiyokazu Takagi, Toyokawa; Yoshiaki Hoashi, Toyota, both of Japan

[73] Assignee: Nippondenso Co., Ltd., Kariya, Japan

[21] Appl. No.: 520,692

[22] Filed: Aug. 30, 1995

[30] Foreign Application Priority Data

Aug. 30, 1994 [JP] Japan ..................................... 6-205325
Jun. 26, 1995 [JP] Japan ..................................... 7-159216

[51] Int. Cl.⁶ ..................................................... B60Q 1/00
[52] U.S. Cl. ............................ 340/435; 340/557; 342/70; 356/342
[58] Field of Search ..................................... 340/435, 602, 340/557; 342/70, 118; 356/342

[56] References Cited

U.S. PATENT DOCUMENTS

| | | | |
|---|---|---|---|
| 2,907,889 | 10/1959 | De Lisle Nichols et al. | 340/602 |
| 3,589,813 | 6/1971 | Edwin | 356/342 |
| 4,132,991 | 1/1979 | Wocher et al. | 342/70 |
| 4,419,731 | 12/1983 | Puffett | 356/342 |
| 4,643,573 | 2/1987 | McLachlan et al. | 356/342 |
| 4,931,767 | 6/1990 | Albrecht et al. | 340/602 |
| 5,045,856 | 9/1991 | Paoletti | 342/70 |
| 5,247,296 | 9/1993 | Spies | 340/435 |
| 5,291,261 | 3/1994 | Dahl et al. | 340/435 |

FOREIGN PATENT DOCUMENTS

| | | |
|---|---|---|
| 62-15480 | 1/1967 | Japan . |
| 59-142488 | 8/1984 | Japan . |
| 60-201276 | 10/1985 | Japan . |

OTHER PUBLICATIONS

Watanabe, "A CMOS Time-to-Digital Converter LSI with HAlf-Nanosecond Resolution Using a Ring Gate Delay Line", IEICE Transactions on ELectronics, vol. E76-C, No. 12, Dec. 1993, pp. 1774-1779.

*Primary Examiner*—Jeffrey Hofsass
*Assistant Examiner*—John A. Tweel, Jr.
*Attorney, Agent, or Firm*—Cushman Darby & Cushman IP Group of Pillsbury Madison & Sutro LLP

[57] ABSTRACT

A distance measuring system for an automotive vehicle is provided. The distance measuring system outputs laser pulse signals at given angular intervals over an object detectable zone, and receives a signal produced by reflection of one of the outputted signals from a reflective object to determine the distance to the object. The distance measuring system also includes an object type determining function of determining a type of the object present in the object detectable zone. When there are a plurality of signals produced by dispersion of a single shot of the laser pulse signals, and when distances derived by signals reflected from most of the object detectable zone show given shorter distance values, the object present in the object detectable zone is identified as a particle such as snow or fog floating in the air.

17 Claims, 7 Drawing Sheets

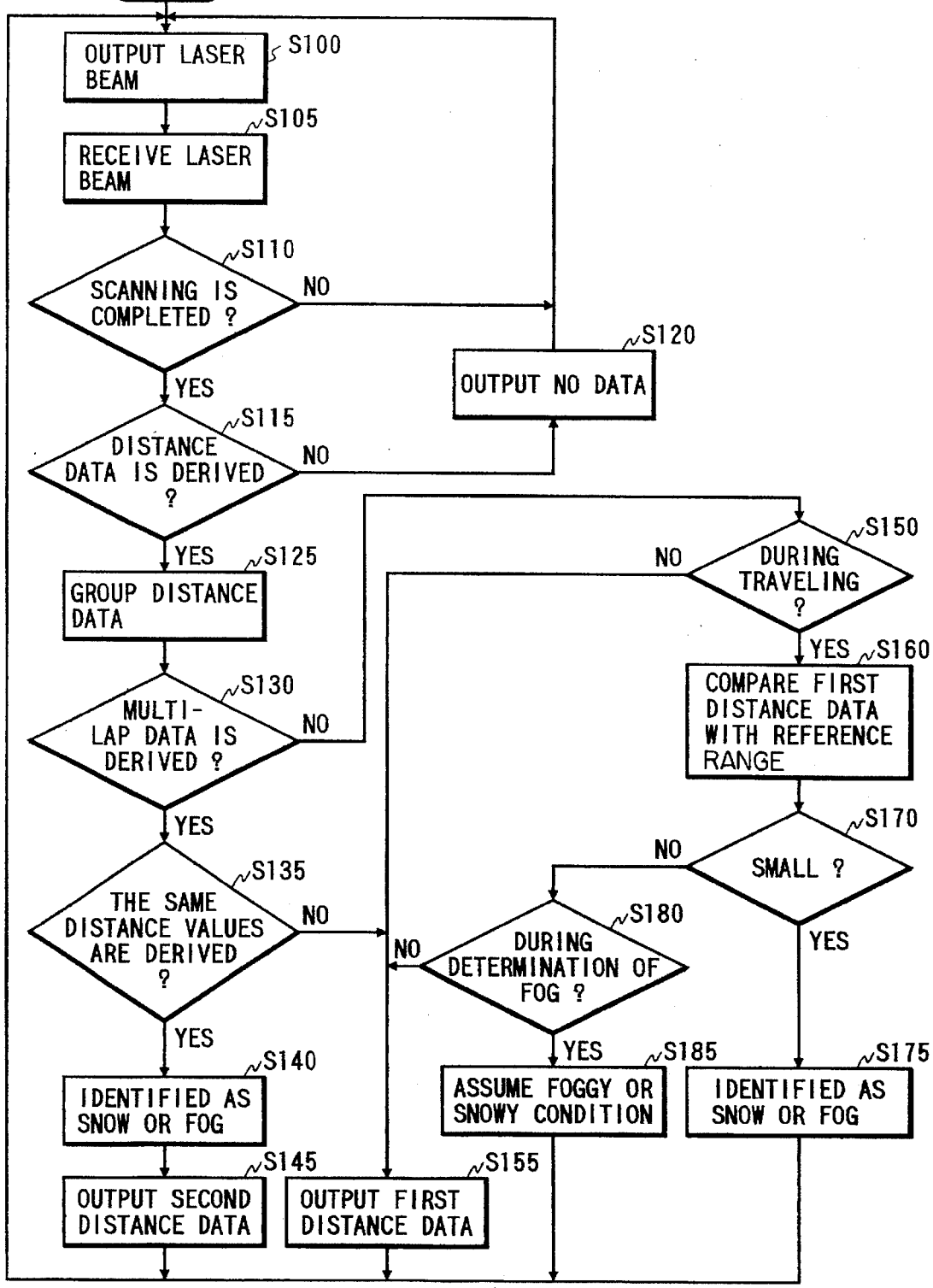

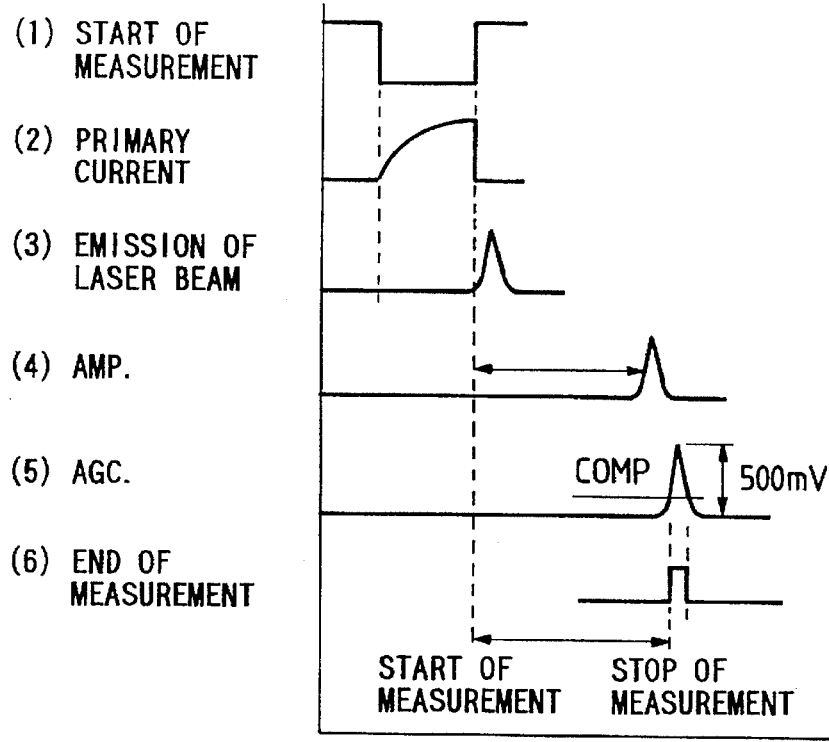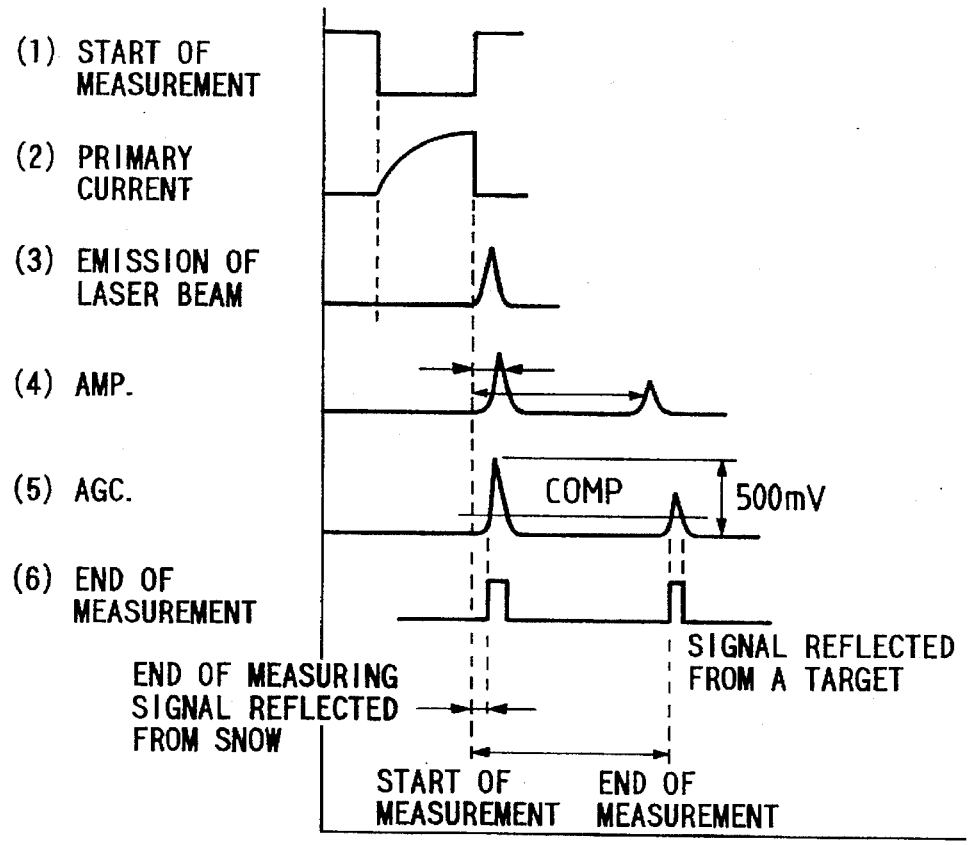

DISTANCE MEASURING APPARATUS FOR AUTOMOTIVE VEHICLES THAT COMPENSATES FOR THE INFLUENCE OF PARTICLES FLOATING IN THE AIR

BACKGROUND OF THE INVENTION

1. Technical Field

The present invention relates generally to a distance measuring apparatus designed to transmit laser pulse signals at given cycles to receive the signal reflected from a reflective object to determine the distance to the object based on a time difference between the transmission of the pulse signal and the reception of the reflected signal. More particularly, the invention is directed to such a distance measuring apparatus which may be employed in an automotive anticollision system which measures the distance to an object present ahead of a vehicle for avoiding a collision therewith.

2. Background Art

Japanese Patent First Publication Nos. 59-142488, 60-201276, and 62-15480 teach conventional distance measuring systems for automotive vehicles which transmit pulse signals in the form of light waves or milimetric waves intermittently, and receive the signal reflected from a reflective object to determine the distance thereto based on a time difference between the transmission of the pulse signal and the reception of the reflected signal.

Specifically, Japanese Patent First Publication No. 59-142488 performs the so-called STC (Sensitivity Time Control) that decreases the sensitivity of signal reception upon transmission of a light signal, and then increases it with time. Usually, when a vehicle travels in a foggy or snowy condition, the system receives light diffused by particles of fog or snow. The reflectivity of fog or snow is much smaller than that of a vehicle body, but the reflection occurs at shorter distance, resulting in increased intensity of a received light (the intensity of reflected light is proportional to the distance to a reflective object to the fourth power). Therefore, the system taught in this publication decreases the sensitivity of reception of light reflected from a short range in order to prevent the distance to an reflective object from being mistakenly determined based on light reflected from fog.

Japanese Patent First Publication No. 60-201276 teaches a system which stores a light intensity range of light reflected from particles such as fog floating in the air relative to the distance to the particles, and provides no output when a signal level of received light falls within the light intensity range. In practice, when the intensity of received light <20 P where P is a light intensity limit in shortest detection range, and the distance L<20 m, the system considers received light as being reflected from fog.

Japanese Patent First Publication No. 62-15480 discloses an automotive fog detection system which judges fog to be formed when a vehicle speed is greater than a given value and derived distance data shows a value more than a preselected value over a given period of time. This is based on the following facts. For example, when a preceding vehicle is traveling at more than a given speed or an obstacle present ahead remains stationary, derived data of distance to the object is changed immediately. In addition, even when a preceding vehicle is traveling at the same speed as that of a system vehicle, the distance to the preceding vehicle is usually changed continuously so that it hardly remains constant over a given period of time, while when the fog is formed within a detection range, the distance data assumes a constant value regardless of the speed of the system vehicle.

The above prior art systems, however, encounter the following drawbacks.

(1) It is impossible to distinguish a lower reflectivity object from fog, so that the systems fail to detect the lower reflectivity object if present in a short range.

(2) The systems fail to detect an object to which the distance is to be measured if they detect fog.

The above discussed publications Nos. 59-142488 and 60-201276 are based on the nature of fog that it is usually generated at short range ahead of a vehicle and shows a lower reflectivity to decrease the sensitivity of signal reception upon transmission of a light signal and then decrease it with time or to output no distance signal when a received light signal falls within the given light intensity range. Thus, these systems cannot distinguish between a lower reflectivity object present at short range and the fog.

Usually, reflectors mounted on vehicles and white vehicle bodies show high reflectivities, while, for instance, persons wearing dark clothes, and dirty or dark vehicles show lower reflectivities. In addition, since portions beneath beds of trucks are generally printed black and are level with a light signal outputted from a distance measuring system, they also show a lower reflectivity.

The fog detection system taught in the publication No. 62-15480 detects the formation of fog based on the fact that derived distance data shows a constant value due to the nature of fog regardless of a vehicle speed. Since this system is, however, designed to detect only one object, once the fog is detected, the system cannot detect another object present away from the detected fog the distance to which is to be measured.

SUMMARY OF THE INVENTION

It is therefore a principal object of the present invention to avoid the disadvantages of the prior art.

It is another object of the present invention to provide a distance measuring system which is capable of measuring the distance to a target correctly even in a foggy or snowy condition.

According to one aspect of the present invention, there is provided a distance measuring apparatus which comprises a signal outputting means for outputting signals at preselected angular intervals over a given object detectable zone, a signal receiving means for receiving a signal produced by reflection of at least one of the outputted signals from an object present in the given object detectable zone, a time difference determining means for determining a time difference between output of the one of the outputted signals and reception of the signal by the signal receiving means, a storange means for storing a reference distance range determined based on a period of time required for one of the signals provided by the signal outputting means to be reflected by a given particle floating in the air and received by the signal receiving means after the one of the signals is outputted, and a distance determining means for determining a distance to the object present in the given object detectable zone based on the time difference determined by the time difference determining means and the reference distance range stored in the storange means.

In the preferred mode of the invention, the signal outputting means emits laser pulse signals over the given object detectable zone.

The reference distance range is defined by a time required for the one of the signals to be dispersed by snow, fog, or rain and received by the signal receiving means.

According to another aspect of the invention, there is provided a distance measuring apparatus for an automotive vehicle which comprises a signal outputting means for outputting signals at given cycles over a given object detectable zone around the vehicle, a signal receiving means for receiving a signal produced by reflection of one of the outputted signals from an object present in the given object detectable zone, a vehicle traveling condition determining means for determining whether the vehicle is traveling or not to provide a signal indicative thereof, a time difference determining means for determining a time difference between output of the one of the outputted signals and reception of the signal by the signal receiving means, a storage means for storing a reference distance range determined by a time difference required for one of the signals provided by the signal outputting means to be reflected from a given particle floating in the air and received by the signal receiving means, and a distance determining means for determining a distance to the object present in the given object detectable zone based on the time difference determined by the time difference determining means, the reference distance range stored in the storage means, and the signal provided by the vehicle traveling condition determining means.

In the preferred mode of the invention, an object type determining means is further provided for determining a type of object present in the given object detectable gone. The distance determining means determines distances based on time differences determined by the time difference determining means for given measurement cycles. The object type determining means determines that the distances determined by the distance determining means are distances to particles floating in the air in the object detectable zone when the vehicle traveling condition determining means determines that the vehicle is traveling, and when the determined distances are within the reference distance range.

When the signal receiving means receives a plurality of signals produced by a plurality of reflections of at least one of the signals outputted by the signal outputting means from the given object detectable zone, the time difference determining means determines a time difference based on each of the received signals, and the distance determining means determines a distance based on each of the determined time differences. When there are signals of the signals received by the signal receiving means reflected from a preselected area of the object detectable zone, show substantially the same shortest distance value, the distance determining means provides a second shorter distance as representing the distance to the object present in the object detectable zone.

Alternatively, when there are signals of the signals received by the signal receiving means reflected from the preselected area of the object detectable zone, show distance values within the reference distance range, the distance determining means provides a second shorter distance among the determined distances as representing the distance to the object present in the object detectable zone.

According to a further aspect of the invention, there is provided a distance measuring apparatus for an automotive vehicle which comprises a signal outputting means for outputting signals at given angular intervals over a given object detectable zone, a signal receiving means for receiving a signal produced by reflection of one of the outputted signals from a reflective object present in the given object detectable zone, a time difference determining means for determining a time difference between output of the one of the outputted signals and reception of the signal by the signal receiving means, a distance determining means for determining a distance to the object based on the time difference determined by the time difference determining means, and an object type determining means for determining a type of the object present in the given object detectable zone. The object type determining means identifies the object as particles floating in the air when there are a plurality of signals produced by a plurality of reflections of the one of the signals outputted by the signal outputting means, received by the signal receiving means, and when there are a plurality of signals produced by reflections of the signals outputted by the signal outputting means in a preselected angular area of the given object detectable zone, received by the signal receiving means, and when distances determined by the distance determining means based on the plurality of received signals show given values.

In the preferred mode of the invention, the object type determining means identifies the object as the particles floating in the air when the distances determined by the distance determining means based on the plurality of received signals show substantially the same value.

The distance determining means provides a second shorter distance among the determined distances as representing a distance to a second object other than the particles floating in the air when the object type determining means identifies the object as the particles floating in the air.

When there is no signals produced by the plurality of the reflections of the one of the signals outputted by the signal outputting means, the object type determining means identifies the object as the particles floating in the air when the shortest distance among the determined distances falls within a reference distance range determined based on a period of time required for one of the signals provided by the signal outputting means to be reflected by one of the particles floating in the air in the given object detectable zone and received by the signal receiving means after the one of the signals is outputted.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 2 is a flowchart of a program for measuring the distance to an object performed by a distance measuring apparatus;

FIG. 3(a) is a time chart which represents operations of circuit signals for measuring the distance to an object when one reflected light signal is received;

FIG. 3(b) is a time chart which represents operations of circuit signals for measuring the distance to an object when two reflected light signals are received;

DESCRIPTION OF THE PREFERRED EMBODIMENT

Figure 1:
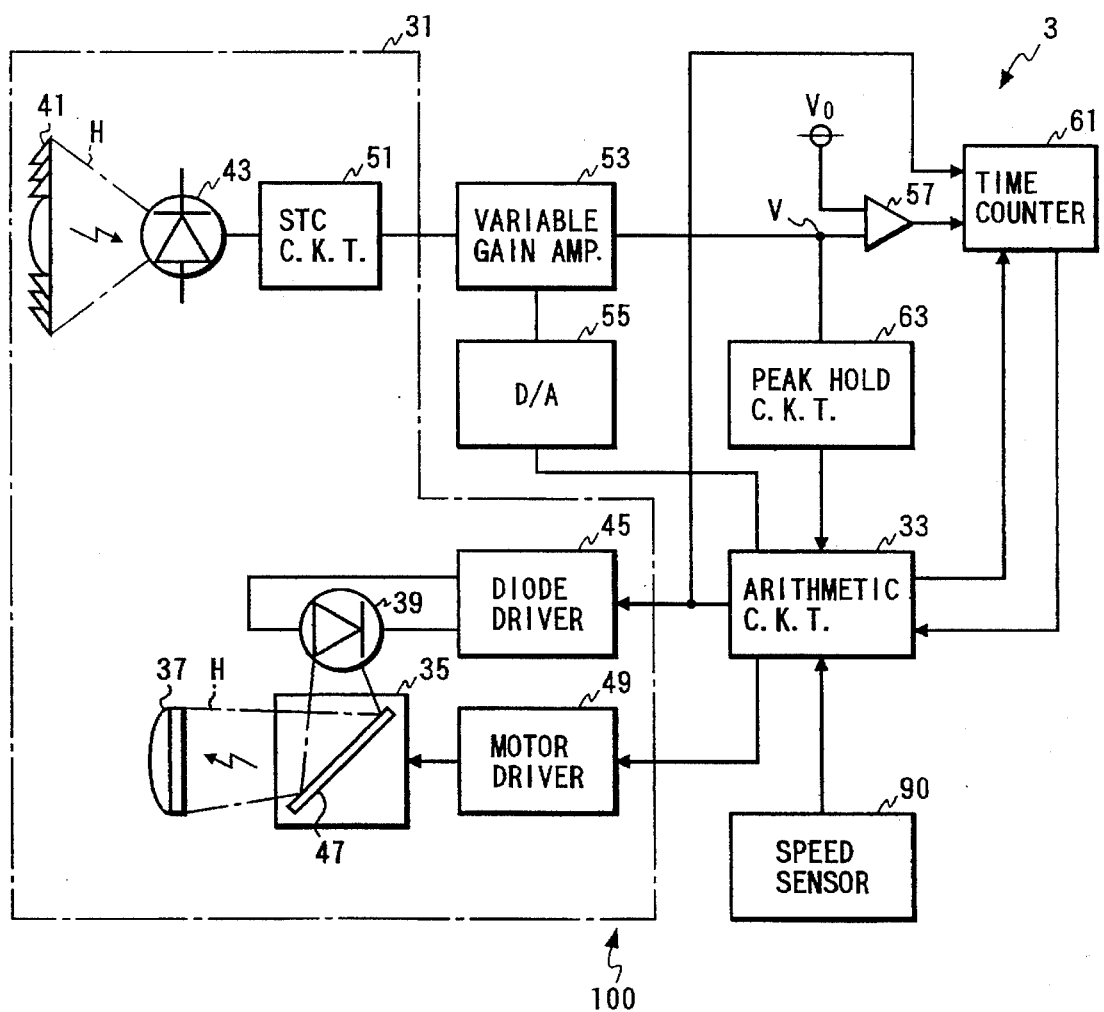
FIG. 1 is a block diagram which shows a distance measuring apparatus according to the present invention.

Referring now to the drawings, particularly to FIG. 1, there is shown a distance measuring apparatus 100 according to the present invention which may be employed in an automotive anticollision radar system or an automatic tracking system for controlling the speed of a vehicle so as to follow a preceding vehicle while maintaining a constant intervehicle distance.

The distance measuring apparatus 100 generally includes two major parts: a transceiver unit 31 and an arithmetic circuit 33.

The transceiver unit 31 includes a semiconductor laser diode 39 and a light sensitive element 43. The laser diode 39 emits laser beams H in the form of pulse signals at given angular intervals through a scanning mirror unit 35 and a light emission lens 37. The light sensitive element 43 receives the laser beam(s) H reflected from an obstacle(s) (not shown), and provides a voltage corresponding to the intensity of the received laser beam H. The transceiver unit 31 may alternatively use a radio wave or a supersonic wave instead of the laser beam.

The laser diode 39 is connected to the arithmetic circuit 33 through a diode driver 45, and is responsive to a diode control signal from the arithmetic circuit 33 to emit the laser beams H. The scanning mirror unit 35 consists of a mirror 47 and an electric motor (not shown). The mirror 47 is rotatably supported by a vertically extending shaft, and is moved by the motor horizontally to have the laser beams H scan a frontal detection area over a given angle on a horizontal plane.

A voltage signal outputted from the light sensitive element 43 is amplified by an STC (Sensitive Time Control) circuit 51 to a given level and then inputted to a variable gain amplifier 153. Usually, the intensity of a received signal is inversely proportional to the distance to a target to the fourth power, therefore, if an object having a high reflectivity such as a reflector is present at short range, it will cause the intensity of a received signal to be increased. The STC 51 is provided for compensating for the increase in intensity of the received signal.

The variable gain amplifier 53 is connected to the arithmetic circuit 33 through a D/A converter 55, and amplifies an input voltage according to a gain provided by the arithmetic circuit 33 to output it to a comparator 57. The comparator 57 compares an output voltage V from the variable gain amplifier 53 with a given reference voltage level V0. If the voltage V exceeds the reference voltage V0 (V>V0), then the comparator 57 provides a preselected received light signal to a time counting circuit 61 as a stop pulse signal PB.

To the time counting circuit 61, the diode control signal supplied from the arithmetic circuit 33 to the diode driver 45 is also inputted as a start pulse signal PA. The time counting circuit 61 codes a phase difference (i.e., an input time difference) between the pulse signals PA and PB into a binary digital signal and outputs it to the arithmetic circuit 33. The time counting circuit 61 is designed to convert micro-time intervals into numerical quantities, so that even if there are a plurality of received light signals relative to a single shot of the emitted laser beams H, a time difference of each of the received light signals is determined.

The time counting circuit 61 may be provided with an odd-stage ring oscillator in which an odd number of inverter gate delay circuits inverting input signal levels are connected in a ring form, and a pulse edge is circulated around the connected delay circuits. For example, IEICE TRANS. ELECTRON vol. E76-C. no. 12, pp. 1774-1779, published on December 1993 discloses a suitable ring gate delay circuit system.

The phase difference (i.e., the time difference) between the start pulse signal PA and the stop pulse signal PB is determined in the following manner. In response to input of the start pulse signal PA, a pulse edge is circulated around the ring oscillator, while in response to input of the stop pulse signal PB, it is determined which of the inverter delay circuits the pulse edge provided upon the input of the start pulse signal PA reaches for determining the phase difference between the two pulse signals PA and PB.

The time counting circuit 61 also has a time resolution-correcting function for accurate time counting. By the use of a reference signal (e.g., a crystal oscillating clock), a digital operation correction is made through a digital circuit.

In general, when a digital circuit is used to measure a time, clock cycles are considered as representing the resolution, but the time counting circuit 61, as mentioned above, is designed to convert a time interval (i.e., the phase difference between the two pulse signals PA and PB) into a numerical quantity with the degree of resolution much finer than that provided by a clock circuit. Thus, even if there are a plurality of received light signals relative to a single shot of the laser beams H1, that is, if there are the two stop pulse signals PB relative to the one start pulse signal PA, a phase difference of each of the received light signals may be determined. In the following discussion, this phase difference detection is called "multi-lap detection". Distance data derived is called "multi-lap distance data".

Referring back to FIG. 1, the arithmetic circuit 33 determines both the distance to an obstacle lying within the detection zone and the direction thereof based on the phase difference (i.e., the time difference) derived by the time counting circuit 61 and an angle of the mirror 47. The variable gain amplifier 53 also provides the output voltage V to the peak hold circuit 63. The peak hold circuit 63 provides a maximum value of the output voltage V to the arithmetic circuit 33.

The arithmetic circuit 33 receives a vehicle speed signal derived by a vehicle speed sensor 90 which may be provided with a speedometer, for example.

An operation of the distance measuring apparatus 100 will be described below. FIG. 2 shows a flowchart of a program or sequence of logical steps performed by the arithmetic circuit 33. FIG. 3(a) is a time chart which represents operations of circuit signals provided upon measurement of the distance to an object when one reflected light signal is received, while FIG. 3(b) is a time chart which represents operations of the circuit signals when two reflected light signals are received.

In FIG. 2, after entering the program, the routine proceeds to step 100 wherein the diode control signal is outputted to the diode driver 45 to activate the laser diode 39 to emit the laser beams H (see (1) to (3) in FIGS. 3(a) and 3(b)). The routine then proceeds to step 105 wherein the laser beam H reflected from an obstacle (not shown) is received as a reflected signal through the light-receiving lens 41. The received laser beam H is converted by the light sensitive element 43 into a voltage signal of a level corresponding to the intensity of the received laser beam H, and then inputted to the time counting circuit 61 through the STC circuit 51, the variable gain amplifier 53, and the comparator 57 (see (4) and (5) in FIGS. 3(a) and 3(b)). The time counting circuit 61, if there are a plurality of reflected signals, finds a phase difference of each of the reflected signals (see (6) in FIG. 3(b)) to provide multi-lap distance data to the arithmetic circuit 33. The multi-lap distance data is then stored in a RAM (not shown) of the arithmetic circuit 33.

When the motor control signal is provided by the arithmetic circuit 33 to the scanning mirror unit 35 through the motor driver 49, the mirror 47 is moved or swung horizontally to scan the frontal detection zone so that the laser beams H are emitted over a given angle in front of the vehicle.

In step 110, it is determined whether the scanning of the laser beams H over the whole of the detection zone has been completed or not. If a NO answer is obtained meaning that the scanning of the laser beam H is not yet completed, then the routine returns back to step 100.

If a YES answer is obtained in step 110, then the routine proceeds to step 115 wherein it is determined whether any distance data is derived or not. If a NO answer is obtained meaning that there is no distance data, then the routine proceeds to step 120 wherein no distance data is outputted.

If a YES answer is obtained in step 115, then the routine proceeds to step 125 wherein the distance data is grouped into several types in the following manner. The distance measuring apparatus 100 of this embodiment, as described above, uses a scanning type of laser beam unit which activates the laser diode 39 each time the mirror 47 rotates a given angle (e.g., 0.5 deg.) so that a plurality of laser beams H are radiated discontinuously in different directions over the detection zone. Each piece of the distance data is thus identified as corresponding to one of the laser beams H radiated in different directions, so that even if some pieces of the distance data are derived based on light signals reflected from the same object, they are processed as different data. For this reason, in this embodiment, the distance data pieces close to each other are grouped together for simplicity of subsequent proceedings.

The close relation between the distance data pieces may be defined according to various conditions. It is, however, advisable that when the distance data pieces derived by laser beams radiated in directions adjacent to each other show values close to each other, they be grouped together. This is because when another vehicle is traveling ahead of the system vehicle, some of the laser beams H emitted at given angles may be reflected from the rear end of the same vehicle.

After step 125, the routine proceeds to step 130 wherein it is determined whether there is the multi-lap distance data or not. This determination is made for determining whether there are a plurality of received light signals relative to a single shot of the laser beams H or not. In the following discussion, it is assumed that the shortest distance value among distance data pieces is referred to as the first distance data, and a second shorter distance value is referred to as the second distance data.

If a YES answer is obtained in step 130 meaning that there is the multi-lap distance data, then the routine proceeds to step 135 wherein it is determined whether or not there are a plurality of distance data pieces showing substantially the same short distance value among distance data pieces derived based on laser beams reflected from most of the scanned detection zone (i.e., a given angular area of the detection zone). Usually, in a snowy or foggy condition, particles of snow or fog will exist uniformly over the scanned detection zone. Thus, when the particles of snow or fog exist uniformly over substantially the entire area of the scanned detection zone, distance data is derived based on light signals dispersed by the particles present at short range.

When the laser beams H scan the right and left areas of the detection zone, the light-receiving efficiency of the optical system will be degraded so that particles of snow or fog cannot be detected. In order to avoid this problem, step 135 does not determine whether the distance data pieces showing substantially the same short distance value are present over the entire area of the detection zone or not, but determine whether they are present in the given angular area of the detection zone or not.

Specifically, it is determined in step 135 whether time differences (i.e., phase differences) derived by laser beams outputted at different scanning angles show the same value or not. This determination compensates for a detection error.

If a YES answer is obtained in step 135 meaning that there is the same short distance values, then the routine proceeds to step 140 wherein it is determined that the system vehicle is traveling in a snowy or fog condition, and this information is stored in the memory. The routine then proceeds to step 145 wherein since the same short distance values derived in step 135 may be considered as the first distance data, the second distance data longer than the first distance data is outputted as representing the distance to the object, after which the routine returns back to step 100.

Alternatively, if a NO answer is obtained in step 135 meaning that substantially the same distance values are not derived at all or they are derived by light signals reflected only from part of the given angular area of the detection zone, it may be considered that the distance data has not been produced by fog or snow, and the routine proceeds to step 155 wherein the first distance data is outputted as representing the distance to the object. The routine then returns back to step 100.

If a NO answer is obtained meaning that there is no multi-lap distance data, that is, that only one of distance data is derived, then the routine proceeds to step 150. In step 150, it is determined whether the system vehicle is traveling or not based on a sensor signal from the speed sensor 90.

If a NO answer is obtained in step 150 meaning that the system vehicle is parked, then the routine proceeds to step 155 wherein the first distance data is outputted. In this case, since only the one piece of distance data is derived, it is outputted as the first distance data. This first distance data cannot be judged to have been produced by fog or another vehicle. However, since the system vehicle is now parked, there is no danger of a collision with the object. Therefore, in step 155, the first distance data is outputted regardless of environmental conditions such as snow or fog.

Alternatively, if a YES answer is obtained in step 150 meaning that the system vehicle is traveling, it is important to determine whether the first distance data is produced by fog etc., or another object. To this end, in step 160, the first distance data is compared with a reference distance range corresponding to a period of time required for the laser beam H to be reflected by particles such as fog or snow floating in the detection zone and received by the transceiver unit 31 after it is outputted. The reference distance range may be set to, for example, less than 8 m. This is based on the fact that light dispersed by snow, fog, or rain is produced at very short range.

Figure 5:
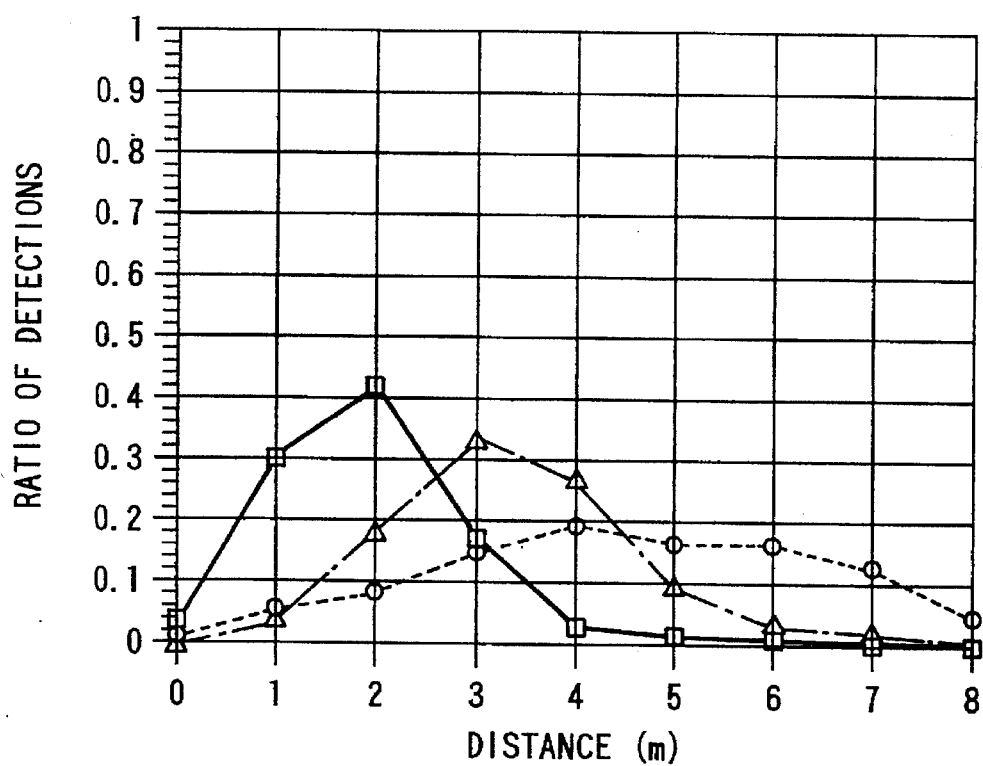
FIG. 5 is a graph which shows the relation between a distance to falling snow detected by a system vehicle and a ratio of detections according to the difference in transmittance.

FIG. 5 shows experimental results representing the relation between a distance to detected falling snow and a ratio of the number of detections. Usually, the transmittance of a laser beam depends upon a snowfall or the density of snow particles. In FIG. 5, "■" indicates distance data when the transmittance is small. "▲" indicates distance data when the transmittance is middle. "●" indicates distance data when the transmittance is great.

As apparent from FIG. 5, when the transmittance is small, the detection ratio shows the highest value when the distance to the detected snow is 2 m. The reference distance range may thus be set to less than 5 m. When the transmittance is middle, the detection ratio shows the highest value when the distance to the detected snow is 3 m. The reference distance range may thus be set to less than 6 m. When the transmittance is great, the detection ratio shows substantially the same value when the distance to the detected snow lies within a range of 2 to 7 m. The reference distance data may thus be set to less than 8 m. It will thus be noted that as long as the reference distance range is set to less than 8 m, it can be determined correctly whether the first distance data assumes a distance to fog etc. or another vehicle. While FIG. 5 shows, as described above, the experimental results for snow, it is found that fog and rain also show substantially the same tendency.

After step 160, the routine proceeds to step 170 wherein it is determined whether the first distance data continuously shows a value within the reference distance range n times (i.e., through n program cycles) or not. If a YES answer is obtained, then the routine proceeds to step 175 wherein it is determined that the system vehicle is traveling in a snowy or foggy condition, and this information is stored in the memory. The routine then returns back to step 100. The determination in step 170 is based on the fact that when it is snowing or fog is generated around the system vehicle, there is a high possibility of the first distance data continuously showing a value within the reference distance data through the n program cycles. Alternatively, for example, when another vehicle is traveling ahead of the system vehicle, there is almost no possibility of the first distance data continuously showing the value within the reference distance range through the n program cycles.

If a NO answer is obtained in step 170, then the routine proceeds to step 180 wherein it is determined whether there is information that fog is generated around the system vehicle or not. The reason for making this determination is that it is insufficient to judge that snow or fog is not generated merely because the first distance data does not show the value within the reference distance range through the n program cycles. For example, if in step 140 or 175, it is determined that snow or fog is generated, and the information thereon is stored in the memory, then the routine proceeds to step 185 without concluding that it is snowing or fog is generated around the system vehicle. In step 185, it is assumed that it would be snowing or fog would be generated around the system vehicle. The routine then returns back to step 100.

Alternatively, if a NO answer is obtained in step 180 meaning that the system vehicle is not traveling in a fog or snow condition, then the routine proceeds to step 155 wherein the first distance data is outputted.

Figure 4:
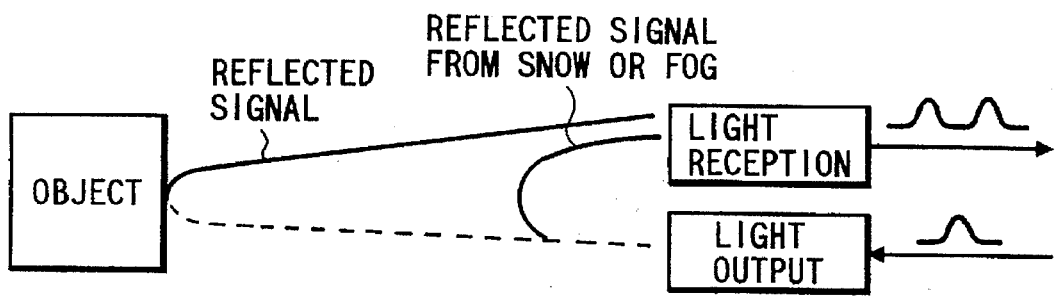
FIG. 4 is an explanatory view which shows movement of a distance-measuring light signal.

As discussed above, the distance measuring apparatus 100 of this embodiment is capable of emitting the laser beams H at given time intervals, detecting a plurality of light signals relative to a single shot of the laser beams H, and determining phase differences or time differences of the reflected light signals to measure distances to objects. Therefore, as exemplified in FIG. 4, even if fog is generated at short range from the system vehicle and an object to be measured is present ahead of the fog, the distance measuring apparatus 100 detects both light signals reflected from the fog and the object to measure time differences of the fog and the object correctly for determining distances to the fog and the object. The determination whether the determined distance is the distance to the fog or the object is made using physical properties of snow and fog. Specifically, the distance measuring apparatus 100 stores in the memory the reference distance range corresponding to a light wave produced by dispersion of a light signal by particles floating in the air in weather conditions such as snow, fog, or rain. For instance, if the same short distance data is derived over most of the detection zone scanned by the laser beams H (YES in step 135), it is judged that it is snowing or fog is generated. It is determined whether the first distance data continuously shows a value within the reference distance range through the n program cycles (step 170). If so, it is judged that it is snowing or fog is generated around the system vehicle (step 175).

Additionally, when a low reflectivity object such as a person wearing dark clothes, a dirty or dark vehicle, a portion beneath a bed of a truck is present at short range, it assumes the same physical properties as those of fog that the fog exists at close range and has a low reflectivity. It is, therefore, difficult to determine whether a received light signal is light reflected from the low reflectivity or the fog. In the distance measuring apparatus 100, this problem is solved based on the determination of whether the system vehicle is now traveling or not.

For example, when a preceding vehicle is traveling at a speed higher than that of the system vehicle, or when an obstacle remains stationary (including a vehicle being parked), time difference data derived by a reflected light signal is changed immediately. In addition, even if a preceding vehicle is traveling at the same speed as that of the system vehicle, it is seldom that such a situation remains long, so that an intervehicle distance is changed constantly.

The second embodiment will be discussed below.

In the above first embodiment, the scanning mirror unit 35 swings the mirror 47 horizontally to have the laser beams H scan the given detection zone. The present invention may alternatively use a fixed laser beam radiating system.

The fixed laser beam radiating system does not use the scanning mirror unit 35 and the motor driver 49. Instead, the laser diode 39 is constructed so as to emit a laser beam having the width expanding over a given angular range (substantially equal to the detection zone in the first embodiment).

Figure 6:
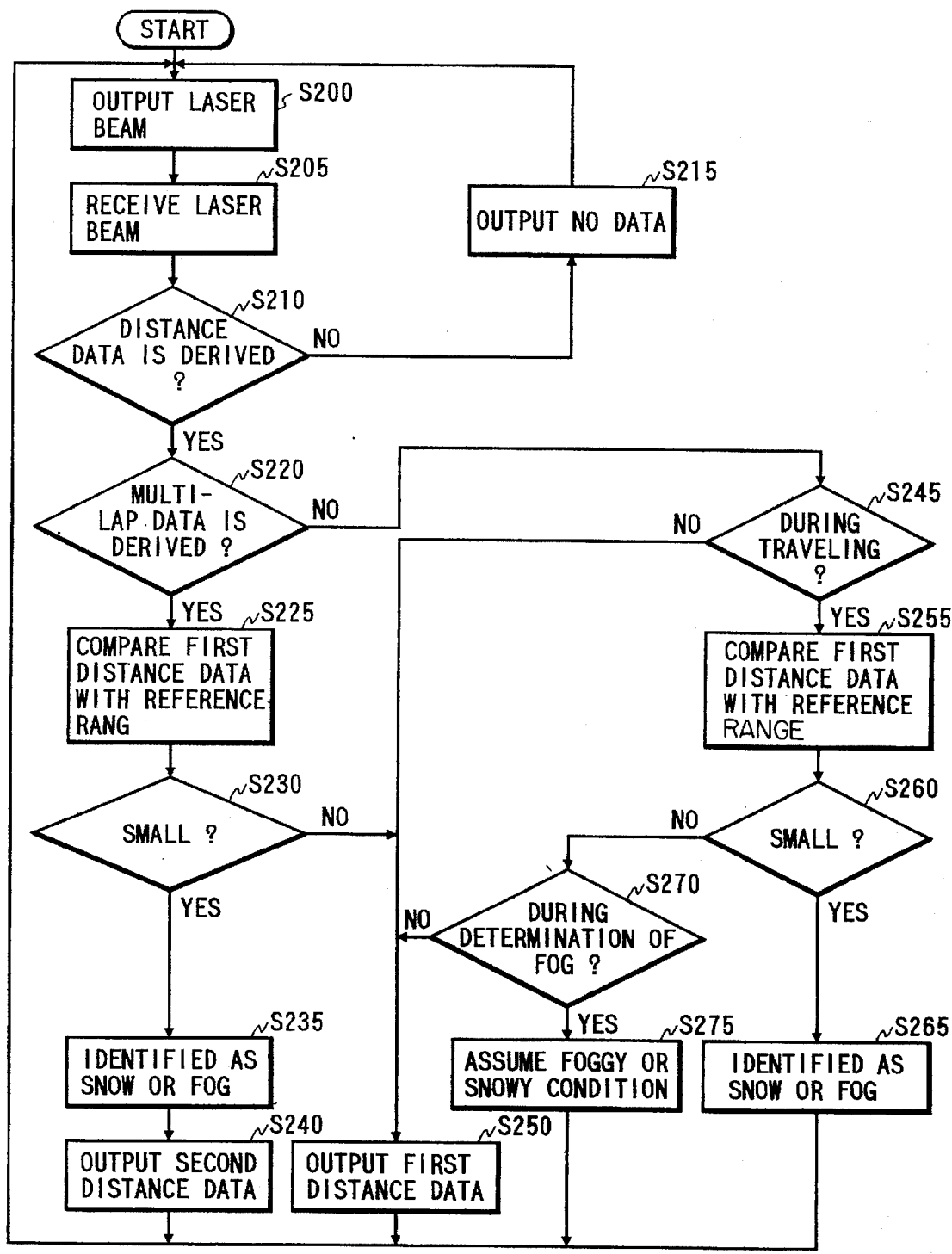
FIG. 6 is a flowchart of a program for measuring the distance to an object performed by a distance measuring apparatus according to the second embodiment.

FIG. 6 shows a flowchart of a program performed by the distance measuring apparatus 100 using the fixed laser beam radiating system. This flowchart does not include steps 110, 125, and 135, as performed in the flowchart of the first embodiment. Specifically, because of the difference in type of the laser beam radiating system, it is not necessary for the second embodiment to make the determinations of whether the scanning of the laser beam H over the whole of the detection zone is completed or not and whether a plurality of substantially the same short distance values are derived based on light signals reflected from most of the scanned detection zone or not, and does not group the plurality of the derived distance data.

Therefore, in step 220, if a YES answer is obtained meaning that there is multi-lap distance data, then the routine proceeds to step 225 wherein the first distance data is compared with the reference distance range. The routine then proceeds to step 230 wherein it is determined whether the first distance data continuously shows a value within the reference distance range through m program cycles or not. Note that a number "m" may be equal to a number "n" or alternatively different therefrom. If a YES answer is obtained, then the routine proceeds to step 235 wherein it is determined that the first distance data is derived based on light signals reflected from snow or fog. In step 240, the second distance data is outputted as representing the distance to an object, and then the routine returns back to step 200.

If a NO answer is obtained in step 220, then the routine proceeds to step 245 wherein it is determined whether the system vehicle is traveling or not. The subsequent steps 255 to 275 are identical with steps 160 to 185 shown in FIG. 2, and explanation thereof in detail will be omitted here.

The third embodiment will be described below. The feature of the present invention is, as apparent from the above discussion, that distance data derive by the use of specific properties of snow or fog is distinguished from data derived by a desired object to be measured. Hereinafter, the properties of snow or fog will be studied in more detail.

Time difference values derived by light signals dispersed by particles floating in the air in weather conditions such as snow, fog, or rain depends upon the so-called veiling reflections caused by the floating particles, therefore, each of the time difference values should show substantially the same value in principle. For this reason, step 135 shown in FIG. 2 is provided on the assumption that particles such as snow or fog exist uniformly over the entire area of the detection zone scanned by the laser beams.

The density of the floating particles may, however, be different within the detection zone. Particularly, in case of fog, a dense fog may be generated locally. The difference in density of the floating particles, therefore, leads to the difference in transmittance relative to a laser beam. Specifically, a small transmittance results in an increased level of a reflected wave so that its peak value will be high, while a great transmittance results in a decreased level of a reflected wave so that its peak value is lowered.

Figure 8A:
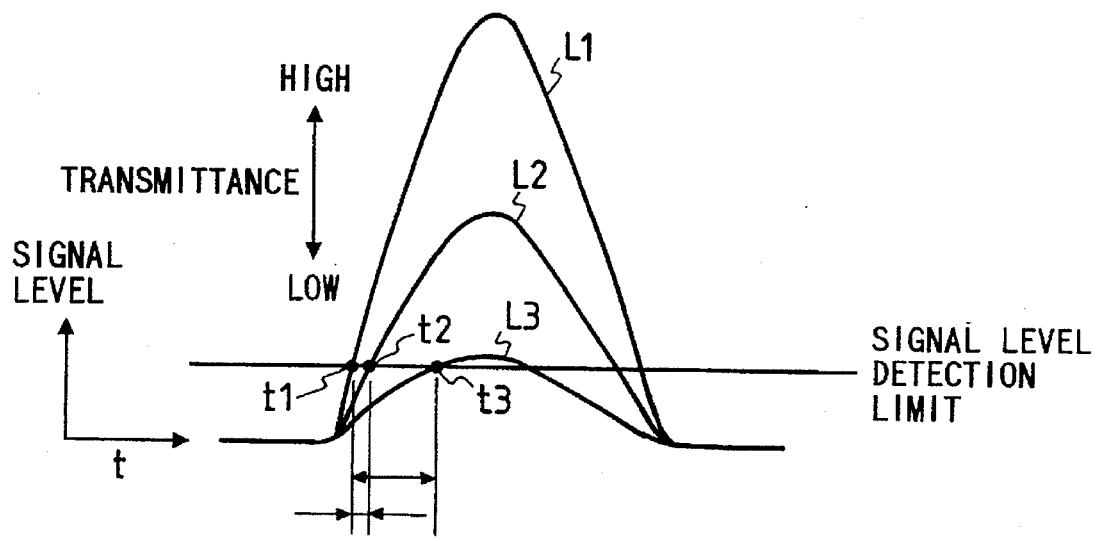
FIG. 8(a) is a time chart which shows variations in level of signals reflected from floating particles according to the difference in transmittance of the floating particles.

FIG. 8(a) shows variations in level of three detected light signals L1, L2, and L3 according to the degree of transmittance. Upon each of the light signals L1 to L3 exceeding a signal level detection limit, it may be used to determine the distance to an object. As clearly shown in FIG. 8(a), the three light signals L1 to L3 exceed the signal level detection limit at different times t1, t2, and t3. This results in detection errors caused by differences in distance corresponding to the time differences between t1, t2, and t3. Specifically, the difference in density of floating particles such as fog or snow causes the difference in detection time.

Figure 7:
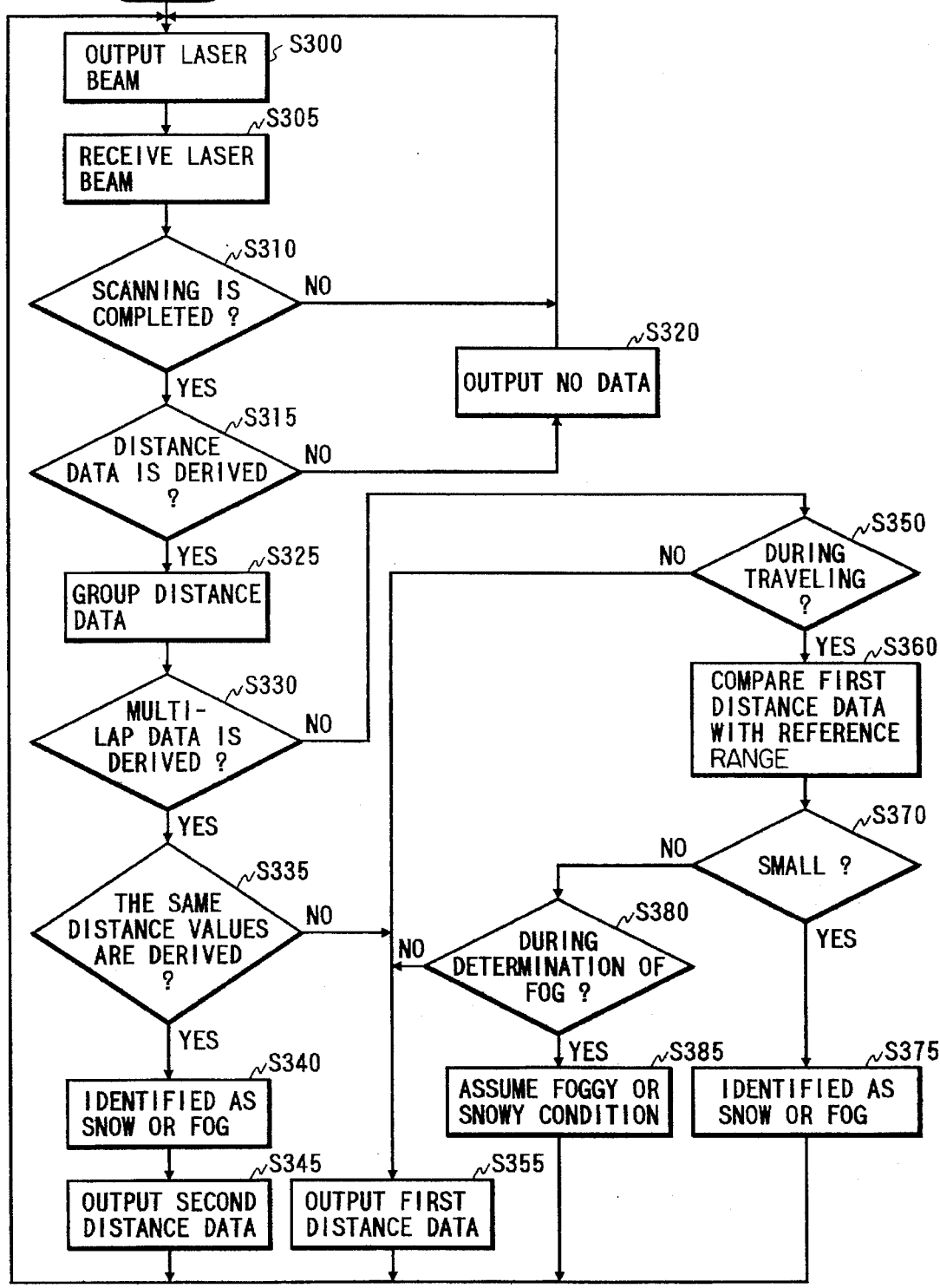
FIG. 7 is a flowchart of a program for measuring the distance to an object performed by a distance measuring apparatus according to the third embodiment.

The third embodiment aims at eliminating the above problem. FIG. 7 shows a flowchart of a program performed by the distance measuring apparatus 100 of the third embodiment. Explanation of the same steps as those in FIG. 2 will be omitted here.

In step 335, it is determined whether or not there are a plurality of distance data pieces showing substantially the same short distance value among distance data pieces derived based on laser beams reflected from the given angular area of the scanned detection zone. The reference distance range is, as mentioned above, set to about less than 8 m. The snow or fog is, as can be seen in FIG. 5, usually detected within 8 m regardless of the degree of transmittance. Thus, if the detection zone scanned by the laser beams partially has a large transmittance area, as long as the first distance data shows a value within the reference distance range of less than 8 m within the given angular area of the detection zone, it may be determined in step 340 that it is snowing or fog is generated. Thus, in step 345, the second distance data is outputted as representing the distance to a target.

Figure 8B:
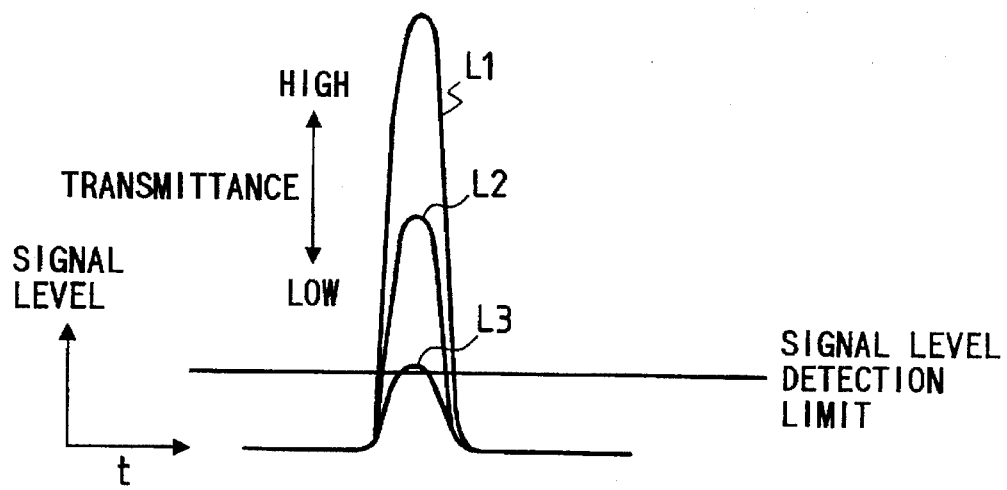
FIG. 8(b) is a time chart which shows variations in level of signals reflected from floating particles when differences in time at which the signals exceed a detection signal level lower limit are decreased in the third embodiment.

The third embodiment is effective when times t1 to t3 at which the three light signals L1 to L3 exceed the signal level detection limit are different from each other, so that distances derived by those time differences will be too great to be ignored. Time intervals among t1 to t3 may, however, be shortened to the extent that time difference data derived by the light signals L1 to L3 may be regarded as being equal to each other by adding a function of controlling the light signals L1 to L3 to rise quickly, as shown in FIG. 8(b), to a circuit arrangement converting reflected light into an electric signal. In addition, decreasing time differences between t1, t2, and t3 below a time resolution of the time counting circuit 61 eliminates measurement errors caused by the difference in transmittance between reflective objects.

The quick rise of the light signals, as shown in FIG. 8(b), may be accomplished by decreasing the reactance (inductive or capacitive) of the laser radiating arrangement around the laser diode 39. Such a technique is already realized in a field of optical communication. For example, there is a laser diode having an emission half-width of the order of several nsec. The use of this type of laser diode requires a frequency band of a light-receiving unit to be expanded. For instance, an avalanche photodiode (APD) may be used as the light sensitive element 43.

Additionally, the quick rise of the light signals improves the measurement accuracy, thereby eliminating the use of the variable gain amplifier 53 and the peak hold circuit 63.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A distance measuring apparatus comprising:

signal outputting means for outputting signals at preselected angular intervals over a given object detectable zone;

signal receiving means for receiving a signal produced by reflection of at least one of the outputted signals from an object present in the given object detectable zone;

time difference determining means for determining a time difference between output of said one of the outputted signals and reception of the signal by said signal receiving means;

storange means for storing a reference distance range determined based on a period of time required for one of the signals provided by said signal outputting means to be reflected by a given particle floating in the air and received by said signal receiving means after the one of the signals is outputted; and distance determining means for determining a distance to the object present in the given object detectable zone based on the time difference determined by said time difference determining means and the reference distance range stored in said storange means.

2. A distance measuring apparatus as set forth in claim 1, wherein said signal outputting means emits laser pulse signals over the given object detectable zone.

3. A distance measuring apparatus as set forth in claim 1, wherein the reference distance range is defined by a time required for the one of the signals to be dispersed by snow, fog, or rain and received by said signal receiving means.

4. A distance measuring apparatus as set forth in claim 1, wherein when said signal receiving means receives a plurality of signals produced by a plurality of reflections of at least one of the signals outputted by said signal outputting means from the given object detectable zone, the time difference determining means determines a time difference based on each of the received signals and said distance determining means determines a distance based on each of the determined time differences, and wherein when some of the signals received by said signal receiving means reflected from a preselected area of the object detectable zone show substantially the same shortest distance value, said distance determining means provides a second shorter distance as representing the distance to the object present in the object detectable zone.

5. A distance measuring apparatus as set forth in claim 1, wherein when said signal receiving means receives a plurality of signals produced by a plurality of reflections of at least one of the signals outputted by said signal outputting means from the given object detectable zone, the time difference determining means determines a time difference based on each of the received signals and said distance determining means determines a distance based on each of the determined time differences, and wherein when some of the signals received by said signal receiving means reflected from a preselected area of the object detectable zone show distance values within the reference distance range, said distance determining means provides a second shorter distance among the determined distances as representing the distance to the object present in the object detectable zone.

6. A distance measuring apparatus for an automotive vehicle comprising:

signal outputting means for outputting signals at given cycles over a given object detectable zone around the vehicle;

signal receiving means for receiving a signal produced by reflection of one of the outputted signals from an object present in the given object detectable zone;

vehicle traveling condition determining means for determining whether the vehicle is traveling or not to provide a signal indicative thereof;

time difference determining means for determining a time difference between output of said one of the outputted signals and reception of the signal by said signal receiving means;

storange means for storing a reference distance range determined by a time difference required for one of the signals provided by said signal outputting means to be reflected from a given particle floating in the air and received by said signal receiving means; and distance determining means for determining a distance to the object present in the given object detectable zone based on the time difference determined by said time difference determining means, the reference distance range stored in said storange means, and the signal provided by the vehicle traveling condition determining means.

7. A distance measuring apparatus as set forth in claim 6, further comprising an object type determining means for determining a type of object present in the given object detectable zone, and wherein said distance determining means determines distances based on time differences determined by said time difference determining means for given measurement cycles, said object type determining means determining that the distances determined by said distance determining means are distances to particles floating in the air in the object detectable zone when the vehicle traveling condition determining means determines that the vehicle is traveling, and when the determined distances are within the reference distance range.

8. A distance measuring apparatus as set forth in claim 6, wherein when said signal receiving means receives a plurality of signals produced by a plurality of reflections of at least one of the signals outputted by said signal outputting means from the given object detectable zone, the time difference determining means determines a time difference based on each of the received signals and said distance determining means determines a distance based on each of the determined time differences, and wherein when some of the signals received by said signal receiving means reflected from a preselected area of the object detectable zone show substantially the same shortest distance value, said distance determining means provides a second shorter distance as representing the distance to the object present in the object detectable zone.

9. A distance measuring apparatus as set forth in claim 6, wherein when said signal receiving means receives a plurality of signals produced by a plurality of reflections of at least one of the signals outputted by said signal outputting means from the given object detectable zone, the time difference determining means determines a time difference based on each of the received signals and said distance determining means determines a distance based on each of the determined time differences, and wherein when some of the signals received by said signal receiving means reflected from a preselected area of the object detectable zone show distance values within the reference distance range, said distance determining means provides a second shorter distance among the determined distances as representing the distance to the object present in the object detectable zone.

10. A distance measuring apparatus for an automotive vehicle comprising:

signal outputting means for outputting signals at given angular intervals over a given object detectable zone;

signal receiving means for receiving a signal produced by reflection of one of the outputted signals from a reflective object present in the given object detectable zone;

time difference determining means for determining a time difference between output of said one of the outputted signals and reception of the signal by said signal receiving means;

distance determining means for determining a distance to the object based on the time difference determined by said time difference determining means; and object type determining means for determining a type of the object present in the given object detectable zone, said object type determining means identifying the object as particles floating in the air when there are a plurality of signals produced by a plurality of reflections of the one of the signals outputted by said signal outputting means, received by said signal receiving means, and when there are a plurality of signals produced by reflections of the signals outputted by said signal outputting means in a preselected angular area of the given object detectable zone, received by said signal receiving means, and when distances determined by said distance determining means based on the plurality of the received signals show given values.

11. A distance measuring apparatus as set forth in claim 10, wherein said object type determining means identifies the object as the particles floating in the air when the distances determined by said distance determining means based on the plurality of the received signals show substantially the same value.

12. A distance measuring apparatus as set forth in claim 10, wherein said distance determining means provides a second shorter distance among the determined distances as representing a distance to a second object other than the particles floating in the air when said object type determining means identifies the object as the particles floating in the air.

13. A distance measuring apparatus as set forth in claim 9, wherein when there is no signals produced by the plurality of the reflections of the one of the signals outputted by said signal outputting means, said object type determining means identifies the object as the particles floating in the air when the shortest distance among the determined distances falls within a reference distance range determined based on a period of time required for one of the signals provided by said signal outputting means to be reflected by one of the particles floating in the air in the given object detectable zone and received by said signal receiving means after the one of the signals is outputted.

14. A distance measuring apparatus as set forth in claim 13, wherein said signal outputting means outputs the signals over the given object detectable zone at distance measurement cycles, said object type determining means identifies the object as the particles floating in the air when the shortest distance among the determined distances falls within the reference distance range for a given number of the distance measurement cycles.

15. A distance measuring apparatus comprising:
   a signal outputting device outputting reflectable signals at preselected angular intervals over a given object detectable zone;
   a signal receiver receiving a reflected signal produced by reflecting at least one of the reflected signals from an object located in the given object detectable zone;
   a time difference determining device determining a time difference between output of said at least one of the reflectable signals and reception of the reflected signal by said signal receiver;
   a storange medium storing a reference distance range determined based on a period of time required for one of the reflectable signals provided by said signal outputting device to be reflected by a given particle floating in the air and received by said signal receiver as a reflected signal; and
   a distance determining device determining a distance to the object located in the given object detectable zone based on the time difference determined by said time difference determining device and the reference distance range stored in said storange medium.

16. A distance measuring apparatus for an automotive vehicle comprising:
   a signal outputting device outputting reflectable signals at given cycles over a given object detectable zone around the vehicle;
   a signal receiver receiving a reflected signal produced by reflecting one of the reflectable signals from an object located in the given object detectable zone;
   a vehicle traveling condition determining device determining whether the vehicle is traveling or not, and providing a traveling signal indicative thereof;
   a time difference determining device determining a time difference between output of said at least one of the reflectable signals and reception of the reflected signal by said signal receiver;
   a storange medium storing a reference distance range determined by a time difference required for one of the reflectable signals provided by said signal outputting device to be reflected from a given particle floating in the air and received by said signal receiver as a reflected signal; and
   a distance determining device determining a distance to the object located in the given object detectable zone based on the time difference determined by said time difference determining device, the reference distance range stored in said storange medium, and the traveling signal provided by the vehicle traveling condition determining device.

17. A distance measuring apparatus for an automotive vehicle comprising:
   a signal outputting device outputting reflectable signals at given angular intervals over a given object detectable zone;
   a signal receiver receiving a reflected signal produced by reflecting one of the reflectable signals from a reflecting object located in the given object detectable zone;
   a time difference determining device determining a time difference between output of said one reflectable signal and reception of the reflected signal by said signal receiver;
   a distance determining device determining a distance to the object based on the time difference determined by said time difference determining device; and
   an object type determining device determining a type of the object located in the given object detectable zone, said object type determining device identifying the object as particles floating in air when there are a plurality of reflected signals produced by a plurality of reflections of the one reflectable signal output by said signal outputting device and received by said signal receiver, and when there are a plurality of reflected signals produced by reflections of the reflectable signals output by said signal outputting device in a preselected angular area of the given object detectable zone and received by said signal receiver, and when distances determined by said distance determining device based on the plurality of the received signals show given values.

* * * * *